(12) United States Patent
Kohge

(10) Patent No.: US 11,720,771 B2
(45) Date of Patent: Aug. 8, 2023

(54) IMAGE FORMING SYSTEM FOR GENERATING PRINT IMAGE DATA OF AN IMAGE TO INCLUDE IDENTIFICATION INFORMATION IN A MARGIN AREA OUTSIDE THE IMAGE, IMAGE FORMING METHOD, AND STORAGE MEDIUM

(71) Applicant: Hiroaki Kohge, Kanagawa (JP)

(72) Inventor: Hiroaki Kohge, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/655,233

(22) Filed: Mar. 17, 2022

(65) Prior Publication Data

US 2022/0318581 A1    Oct. 6, 2022

(30) Foreign Application Priority Data

Mar. 31, 2021 (JP) ................. 2021-060028

(51) Int. Cl.
 *G06K 15/02* (2006.01)
 *G06K 15/16* (2006.01)
 *G03G 15/00* (2006.01)
(52) U.S. Cl.
 CPC ......... *G06K 15/1856* (2013.01); *G03G 15/50* (2013.01); *G06K 15/16* (2013.01)
(58) Field of Classification Search
 None
 See application file for complete search history.

(56) References Cited

U.S. PATENT DOCUMENTS

| | | | |
|---|---|---|---|
| 2011/0211008 A1* | 9/2011 | Teshigawara | B41J 13/0045 347/16 |
| 2013/0250319 A1 | 9/2013 | Kaneko et al. | |
| 2014/0079293 A1 | 3/2014 | Kitai et al. | |
| 2014/0268259 A1 | 9/2014 | Kitai | |
| 2014/0313538 A1 | 10/2014 | Kitai et al. | |
| 2015/0269719 A1 | 9/2015 | Kitai | |
| 2017/0031636 A1 | 2/2017 | Kitai | |
| 2017/0109617 A1* | 4/2017 | Narimatu | G03G 15/6582 |
| 2021/0042065 A1 | 2/2021 | Yamamoto | |

FOREIGN PATENT DOCUMENTS

| | | |
|---|---|---|
| JP | 2009-133741 | 6/2009 |
| JP | 2017-167306 | 9/2017 |
| JP | 2019-195211 | 11/2019 |

OTHER PUBLICATIONS

Extended European Search Report for 22162321.8 dated Sep. 5, 2022.

* cited by examiner

*Primary Examiner* — Andrew H Lam
(74) *Attorney, Agent, or Firm* — IPUSA, PLLC

(57) ABSTRACT

An image forming system includes processing circuitry. The processing circuitry generates print image data to for printing a first image included in print job data, on a conveyance medium. The processing circuitry controls printing on the conveyance medium based on the print image data. The processing circuitry sets an area for printing a second image including identification information to identify each page of the conveyance medium, in a first area where the first image is not printed, to generate the print image data.

8 Claims, 14 Drawing Sheets

FIG. 13

| INSPECTION PROCESSING START TIME | NUMBER OF COPIES OF JOB | NUMBER OF PAGES OF JOB | NUMBER OF DEFECT DETECTION PAGES OF JOB |
|---|---|---|---|
| 2020/11/13 15:03:05 | 25 | 121 | 5 |

| DEFECT DETECTION TIME | IDENTIFICATION NUMBER | JOB ID | NUMBER OF DEFECTIVE COPIES OCCURRED IN JOB | NUMBER OF DEFECTIVE PAGES OCCURRED IN JOB |
|---|---|---|---|---|
| 2020/11/13 15:19:01 | 31,976 | 2 | 3 | 25 |
| 2020/11/13 15:19:01 | 32,029 | 2 | 3 | 78 |
| 2020/11/13 15:55:43 | — | 4 | 25 | 16 |
| ... | ... | ... | ... | ... |

909

IMAGE FORMING SYSTEM FOR GENERATING PRINT IMAGE DATA OF AN IMAGE TO INCLUDE IDENTIFICATION INFORMATION IN A MARGIN AREA OUTSIDE THE IMAGE, IMAGE FORMING METHOD, AND STORAGE MEDIUM

CROSS-REFERENCE TO RELATED APPLICATION

This patent application is based on and claims priority pursuant to 35 U.S.C. § 119(a) to Japanese Patent Application No. 2021-060028, filed on Mar. 31, 2021, in the Japan Patent Office, the entire disclosure of which is hereby incorporated by reference herein.

BACKGROUND

Technical Field

Embodiments of the present disclosure relate to an image forming system, an image forming method, and a storage medium.

Related Art

Various technologies have been developed that detect a defect in an image printed by the image forming apparatus, based on a result of reading the image. For example, a technology is known that assign identification information to each page of printed materials and apply the identification information to image of each page so as to facilitate identifying a defective page.

SUMMARY

Embodiments of the present disclosure described herein provide a novel image forming system including processing circuitry. The processing circuitry generates print image data for printing a first image included in print job data, on a conveyance medium. The processing circuitry controls printing on the conveyance medium based on the print image data. The processing circuitry sets an area for printing a second image including identification information to identify each page of the conveyance medium, in a first area where the first image is not printed, to generate the print image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13 is a diagram illustrating an example of a job list;

FIG. 14 is a diagram illustrating an example of a defect detection page list;

Figure 1:
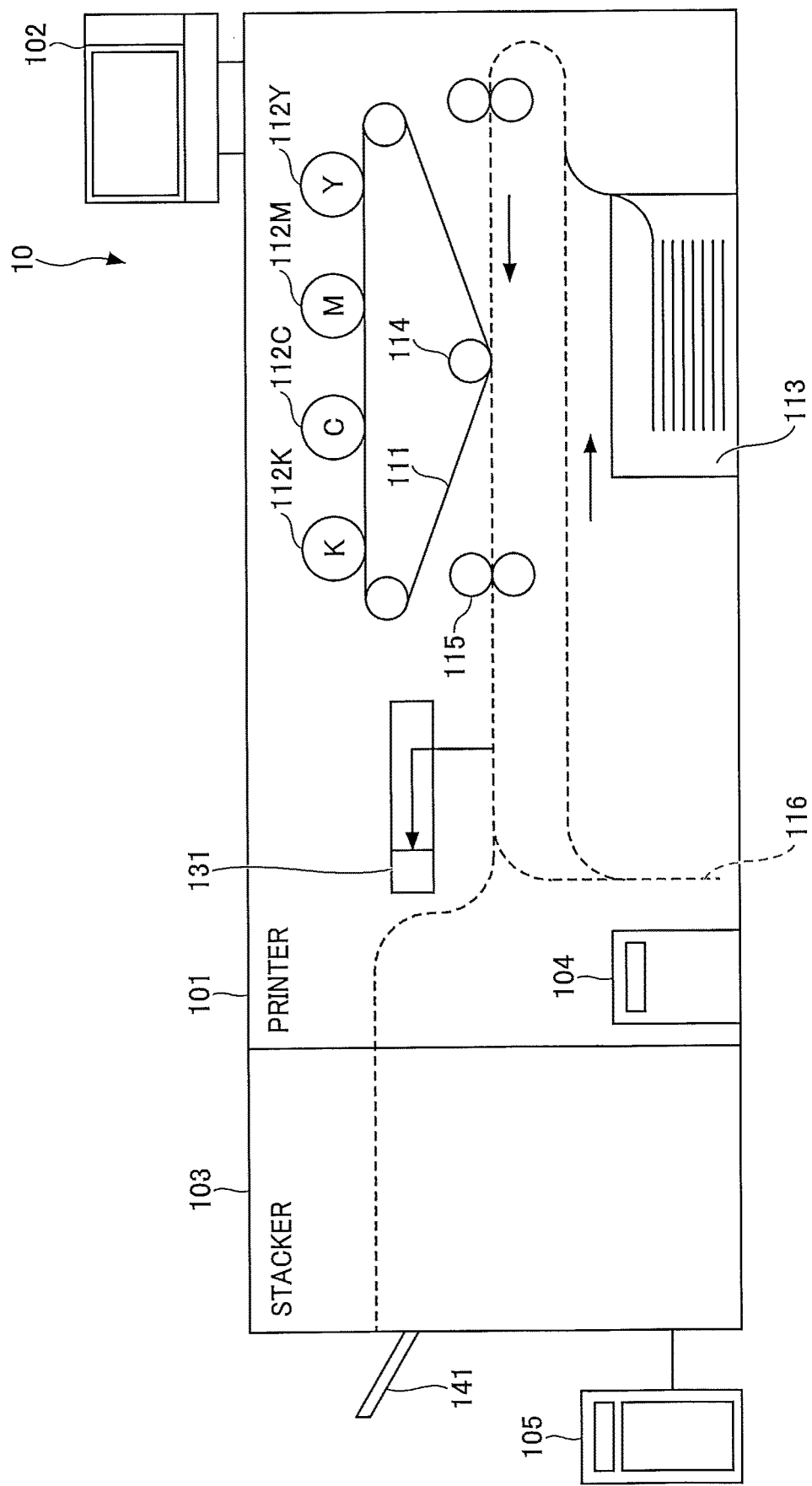
FIG. 1 is a diagram illustrating a system configuration of an image forming system, according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given of an image forming system according to an embodiment of the present disclosure, with reference to the drawings.

FIG. 1 is a diagram illustrating a system configuration of the image forming system, according to embodiments of the present disclosure.

An image forming system 10 includes a printer 101, a stacker 103, an inspection device 104, and a digital front end (DFE) 105.

The printer 101 receives the print job data including a print image (rasterized image) from an external apparatus such as the DFE 105. Then, the printer 101 executes printing in response to an execution instruction based on the received print job data or an execution instruction based on the print job data stored in the printer 101 by a user's operation on an operation panel 102.

The printer 101 includes photoconductor drums 112Y, 112M, 112C, and 112K disposed along a conveyance belt 111. The photoconductor drums 112Y, 112M, 112C, and 112K form yellow (Y), magenta (M), cyan (C), and black (K) toner images, respectively. The photoconductor drums 112Y, 112M, 112C, and 112K are collectively referred to as photoconductor drums 112. The conveyance belt 111 is a moving unit of an endless loop.

Specifically, the printer 101 includes photoconductor drums 112Y, 112M, 112C, and 112K disposed in this order from upstream in the conveyance direction of the conveyance belt 111. The conveyance belt 111 is an intermediate transfer belt on which an intermediate transfer image to be transferred onto a sheet fed from the sheet feed tray 113 along the conveyance belt 111 is formed.

The printer 101 transfers respective images of black (K), cyan (C), magenta (M), and yellow (Y), which are developed with toner on the surfaces of the photoconductor drums 112 for the respective colors, onto the conveyance belt 111 in a superimposing manner to form a full-color image. Then, the printer 101 transfers the full-color image formed on the conveyance belt 111 onto the sheet that has been conveyed by a transfer roller 114 along the sheet conveyance passage, at a position at which the full color image comes closest to the sheet conveyance passage indicated with broken lines in FIG. 1. Accordingly, the full color image is formed on the sheet.

The printer 101 further conveys the sheet S having the image on the surface, so that the image is fixed to the sheet by the fixing roller pair 115. Then, the sheet is conveyed to a reading device 131 disposed downstream from fixing roller pair 115 in the conveyance direction of the sheet. The reading device 131 reads the sheet conveyed via the fixing roller pair 115 and generates read image data.

In the case of single-side printing, the printer 101 directly ejects the sheet read by the reading device 131 to the stacker 103. In the case of duplex printing, the printer 101 reverses the sheet read by the reading device 131, in a sheet reverse passage 116, and then conveys the sheet to the conveyance position of the transfer roller 114 again.

Subsequently, the printer 101 transfers and fixes the toner image to the opposite side of the sheet printed on one side. Then, the reading device 131 reads the printed surface. Subsequently, the printer 101 ejects the duplex printed sheet to the stacker 103.

The stacker 103 stacks and stores the sheets ejected from the printer 101 on a sheet ejection tray 141.

The inspection device 104 is a device that inspects printed sheets by the printer 101. Specifically, the inspection device 104 receives the rasterized image data included in the print job data from the printer 101 and generates a master image. Then, the inspection device 104 compares the read image read by the reading device 131 with the master image, determines whether the read image includes any defect, and transmits information indicating a determination result to the printer 101.

The present embodiment assumes that, for example, that the rasterized image is in the CMYK format (format in a subtractive color mode including cyan, magenta, yellow, and black) with 8-bit colors and 600 dpi resolution, and the read image is in the RGB format with 8-bit colors and 200 dpi resolution. However, embodiments of the present disclosure are not limited to the above-described data formats in image formation.

The DFE 105 receives and manages the print job from a terminal operated by a user. The print job data includes image data and print job information indicating attributes of the job such as the number of copies to be printed, the number of pages to be printed, duplex or single-side printing, and the type of sheet. The DFE 105 adds the received print job data as a queue to a memory that stores the print job data. The DFE 105 extracts print job data from the queue in the order in which the print job data is added to the queue or in accordance with a priority set appropriately. Then, the DFE 105 transmits the print job data to the printer 101.

Figure 2:
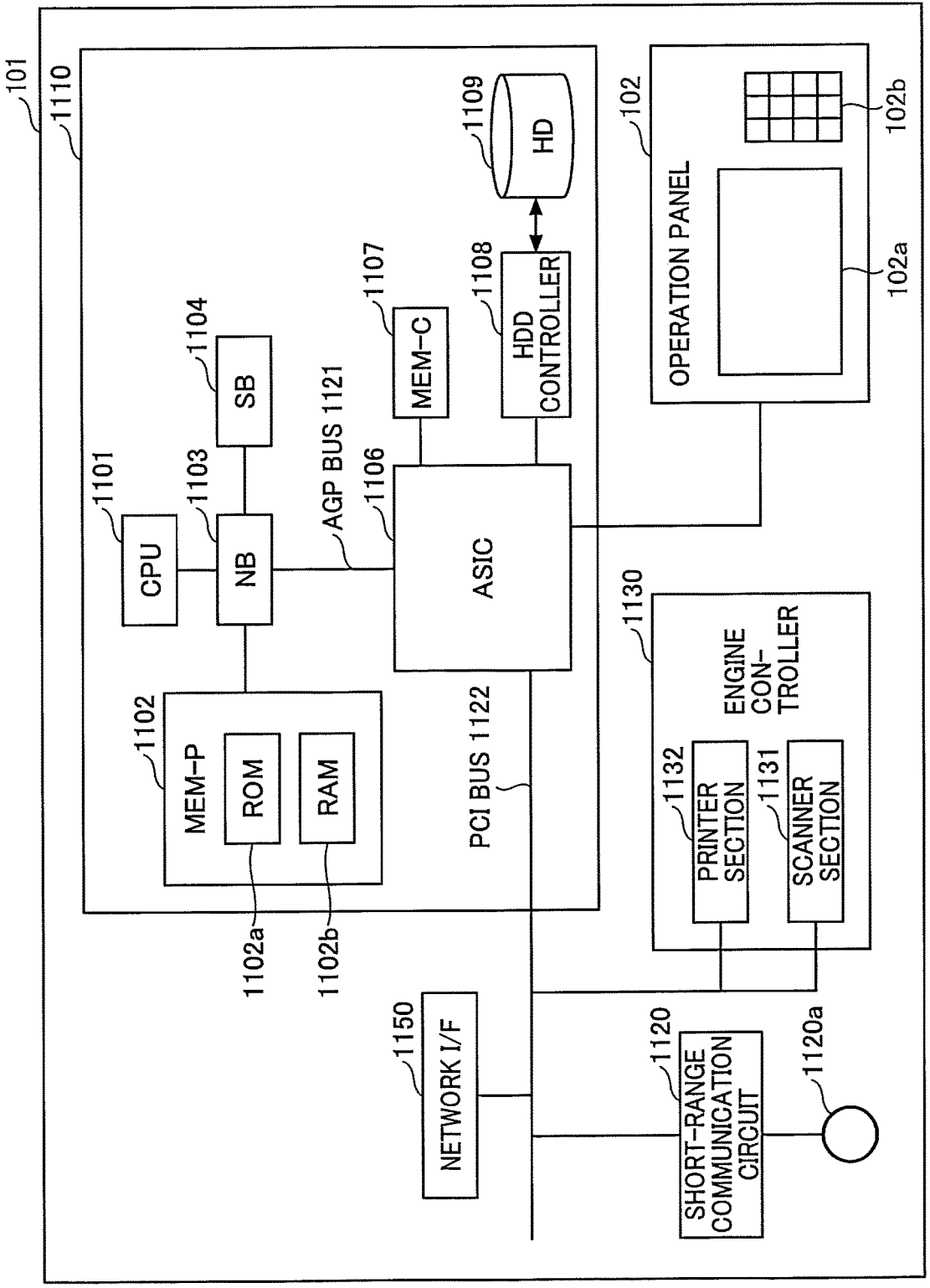
FIG. 2 is a diagram illustrating a hardware configuration of a printer of the image forming system of FIG. 1.

FIG. 2 is a diagram illustrating a hardware configuration of a printer of the image forming system of FIG. 1.

The printer 101 includes a controller 1110, a short-range communication circuit 1120, an engine controller 1130, the operation panel 102, and a network interface (I/F) 1150.

The controller 1110 includes a central processing unit (CPU) 1101 that is a main part of a computer, a system memory (MEM-P) 1102, a north bridge (NB) 1103, a south bridge (SB) 1104, an application specific integrated circuit (ASIC) 1106, a local memory (MEM-C) 1107 that is a memory unit, a hard disk drive (HDD) controller 1108, and a hard disk (HD) 1109 that is a memory.

The NB 1103 and the ASIC 1106 are connected by an accelerated graphics port (AGP) bus 1121.

The CPU 1101 is a control device that performs overall control of the printer 101. The NB 1103 is a bridge configured to connect the CPU 1101, the MEM-P 1102, the SB 1104, and the AGP bus 1121. The NB 1103 includes a memory controller that, controls reading from and writing to the MEM-P 1102, a peripheral component interconnect (PCI) master, and an AGP target.

The MEM-P 1102 includes a read only memory (ROM) 1102$a$ and a random access memory (RAM) 1102$b$. The ROM 1102$a$ is a memory to store programs and data for implementing various functions of the controller 1110. The RAM 1102$b$ is a memory configured to deploy programs, data or to render print data for memory printing. The program stored in the RAM 1102$b$ may be provided as a file in an installable format or an executable format that the program is recorded in a computer-readable storage medium such as a compact disc-read only memory (CD-ROM), a compact disc-recordable (CD-R), or a digital versatile disc (DVD).

The SB 1104 is a bridge configured to connect the NB 1103 to PCI devices and peripheral devices. The ASIC 1106 is an integrated circuit (IC) for image processing having a hardware element for image processing and has a role of a bridge that connects the AGP bus 1121, the PCI bus 1122, the HDD controller 1108, and the MEM-C 1107 to each other.

The ASIC 1106 includes a PCI target, an AGP master, an arbiter (ARB) serving as a core of the ASIC 1106, a memory controller that controls the MEM-C 1107, a plurality of direct memory access controllers (DMAC) that rotates image data by hardware logic, and a PCI unit that transfers data between a scanner section 1131 and a printer section 1132 via the PCI bus 1122. A universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a memory that stores image data, font data used in printing, and forms. The HD 1109 controls reading or writing of data from or to the HD 1109 under the control of the CPU 1101.

The AGP bus 1121 is a bus interface for a graphics accelerator card that has been proposed to speed up graphics processing. The AGP bus 1121 is a bus that directly access the MEM-P 1102 at high throughput to speed up a graphics accelerator card.

The short-range communication circuit 1120 includes a short-range communication antenna 1120$a$. The short-range communication circuit 1120 is a communication circuit that communicates in compliance with the near field radio communication (NFC) or the Bluetooth®.

The engine controller 1130 includes the scanner section 1131 and the printer section 1132. The operation panel 102 includes a panel display 102a and a hard keys 102b. The panel display 102a is, e.g., a touch panel that displays current settings or a selection screen that receives the user input. The hard keys 102b includes, e.g., a numeric keypad and a start key. The numeric keypad receives setting values of image forming parameters such as an image density parameter. The start key receives an instruction to start copying.

The controller 1110 controls the overall printer 101 and controls, for example, drawing, communication, and input from the operation panel 102. The scanner section 1131 reads the image formed on the conveyance medium such as a sheet and generates image data. The printer section 1132 includes a transfer device that transfers the image using a color material such as a toner image onto the conveyance medium such as the sheet, a fixing device that fixes the image, a heating device, a drying device, and performs image formation on the sheet. Further, the scanner section 1131 or the printer section 1132 executes image processing such as error diffusion and gamma conversion.

The network I/F 1150 is an interface that performs communication of data through the communication network. The short-range communication circuit 1120 and the network I/F 1150 are electrically connected to the ASIC 1106 via the PCI bus 1122.

Figure 3:
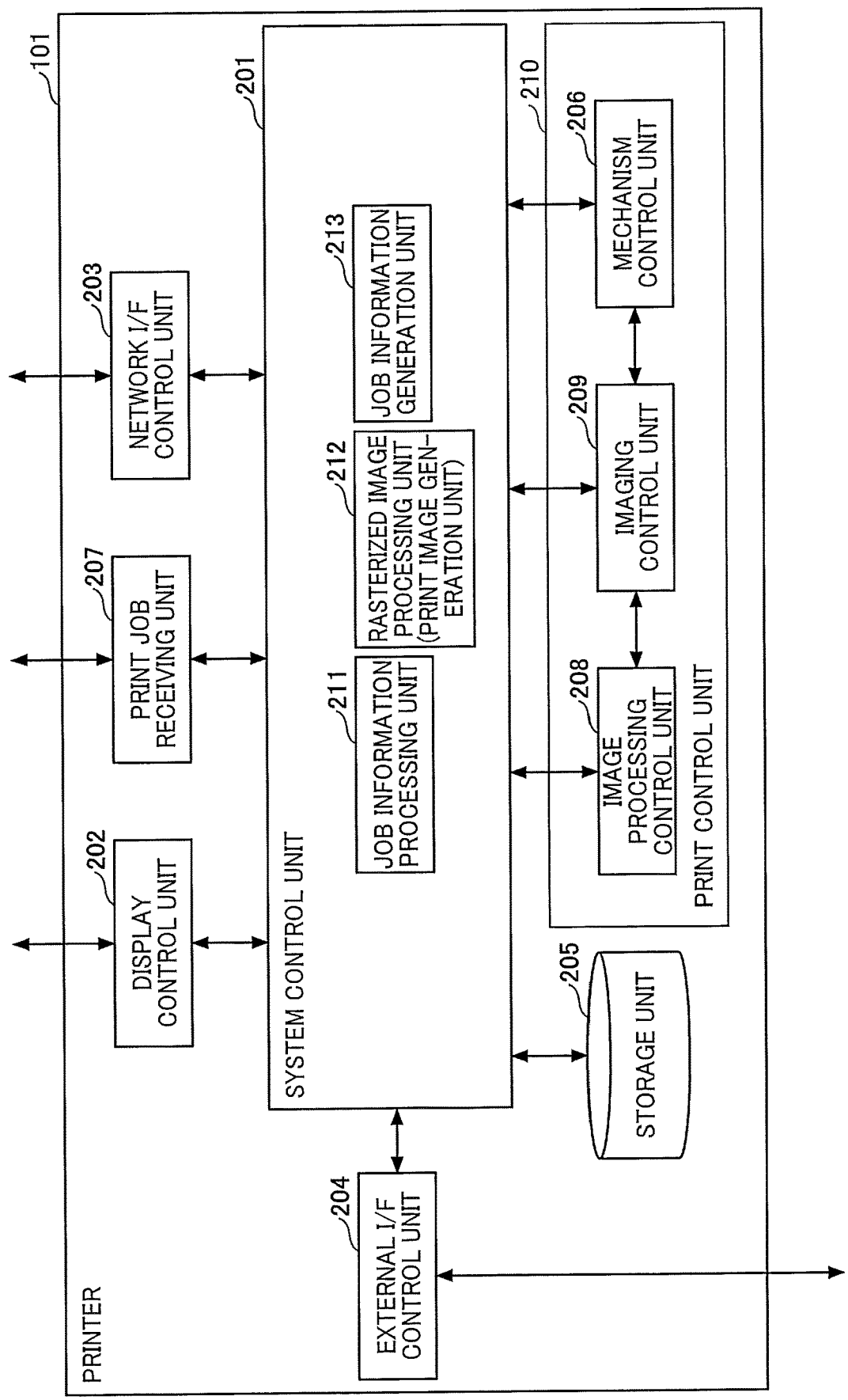
FIG. 3 is a diagram illustrating a functional configuration of the printer of the image forming system of FIG. 1.

FIG. 3 is a diagram illustrating functional configuration of the printer of the image forming system of FIG. 1.

The printer 101 includes a system control unit 201, a display control unit 202, a network I/F control unit 203, an external I/F control unit 204, a storage unit 205, a mechanism control unit 206, a print job receiving unit 207, an image processing control unit 208, and an imaging control unit 209. Each of these units of the printer 11 is achieved by the CPU 1101 or the ASIC 1106 of the printer 11 executing a process defined in programs stored in the MEM-P 1102 or the MEM-C 1107.

The system control unit 201 controls the overall operation of the printer 101. The system control unit 201 includes a job information processing unit 211, a rasterized image processing unit 212, and a job information generation unit 213.

The job information processing unit 211 processes job information included in the print job transmitted from the DFE 105. The job information processing unit 211 adds an identification number for identifying a conveyance medium such as a sheet to job information. The identification number may be, for example, a serial number that is incremented by one for each time a sheet is fed, or may be a number including a job ID, a copy number, and a page number. The identification number is an example of identification information for identifying a conveyance medium. The identification information may be in any form, for example, a numerical value, a character, a barcode, a two-dimensional code, or a combination of these forms. When duplex printing is performed, the identification information may include information indicating whether a page is a front face or a back face or may be a different number for each page so that whether the page is the front face or the back face is identified.

The rasterized image processing unit 212 performs predetermined color conversion processing on the CMYK values or the RGB values of the image data included in the print job data, using a rasterized image processing engine and converts the CMYK values or the RGB values into image data in a CMYK format suitable for printing.

Specifically, the rasterized image processing unit 212 generates print image data for printing an image included in the print job data on a sheet. The image included in the print image data is referred to as a user image or as a first image. In addition, the rasterized image processing unit 212 acquires the identification number from the job information processing unit 211, generates an image indicating the identification number (referred to as an identification number image or a second image), and generates print image data including the generated identification number image and the user image.

To be more specific, the rasterized image processing unit 212 generates the print image data including the identification number image included in a margin area (referred to as a first area) set in advance for each type of sheet as an area where printing is not performed and the user image included in an area other than the margin area (referred to as a user image area or a second area). The specific process of the rasterized image processing unit 212 is described below. Note that the rasterized image processing unit 212 is an example of a print image generation unit that generates a print image.

In a case where a print image is transferred onto a conveyance medium such as a sheet at a position close to the leading end of the conveyance medium in a conveyance direction of the conveyance medium in an electrophotographic printing process, separation of sheet highly likely occurs when the sheet is separated from a fixing device that fixes a color material onto the conveyance medium after the transfer of the print image on the conveyance medium. For this reason, a known technique provides a margin area having an appropriate size at the leading end of a sheet. The margin area is an area set in advance for each type of sheet as an area where printing is not performed.

The job information generation unit 213 generates special job information based on information received from the inspection device 104. For example, in a case where a defect occurs in an image, the job information generation unit 213 may receive information to be printed on a slip sheet from the inspection device 104 and generate job information for printing the slip sheet.

The display control unit 202 controls to display various types of information including job information on the operation panel 102. The network I/F control unit 203 controls the network I/F 1150 and controls connection with a communication network. When another device is connected to the printer 11, the external I/F control unit 204 controls connection with the connected device. The storage unit 205 stores various types of information including job information.

The mechanism control unit 206 controls operations of mechanisms included in the printer 101, such as operations of a mechanism that performs sheet conveyance and operations of a mechanism that performs transfer process in the printer 101 including the printer section 1132. The print job receiving unit 207 receives the print job from the DFE 105. The image processing control unit 208 processes the print image transferred by the mechanism control unit 206. The imaging control unit 209 controls image formation on the conveyance medium. The mechanism control unit 206, the image processing control unit 208, and the imaging control unit 209 cooperate with each other to function as a print control unit 210 that controls printing on a sheet based on the print image data generated by the rasterized image processing unit 212.

Next, descriptions are given of setting of a function to add the identification number image by the above-described rasterized image processing unit 212. The function is referred to as an identification number image adding function.

Figure 4:
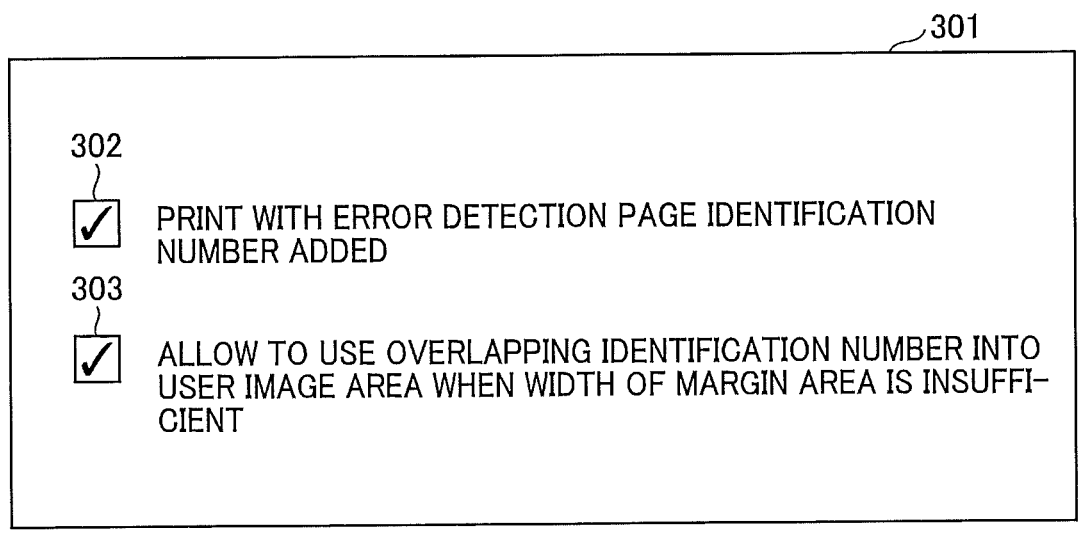
FIG. 4 is a diagram illustrating an example of a setting screen of an identification number image adding function.

FIG. 4 is a diagram illustrating an example of a setting screen of the identification number image adding function.

The setting screen 301 is a screen displayed on the operation panel 102 under the control of the display control unit 202. The setting screen 301 includes a first check box 302 and a second check box 303.

The first check box 302 is a graphical user interface (GUI) for receiving a selection of whether to use the identification number image adding function.

The second check box 303 is a GUI for receiving a selection of whether to add the identification number image in an overlapping manner to the user image area in a case where the identification number image does not fit into the margin area.

The printer 101 stores the contents selected on the setting screen 301 as a setting value in the storage unit 205. For example, the storage unit 205 stores information indicating that the setting value of the identification number image adding function is ON (valid) when the first check box 302 is checked and information indicating that the setting value of the identification number image adding function is OFF (invalid) when the first check box is not checked.

When the second check box 303 is checked, the storage unit 205 stores information indicating that the setting value of the identification number adding function with an insufficient margin setting width is ON (valid). On the other hand, when the second check box is not checked, information indicating that the setting value of the identification number adding function with an insufficient margin setting width is OFF (invalid).

Next, descriptions are given of operations of the image forming system 10. The job information processing unit 211 of the printer 101 assigns an identification number to each page in response to receipt of a print job from the DFE 105. Then, the rasterized image processing unit 212 uses the assigned identification number to execute an identification number image adding process as part of a process for generating a print image.

Figure 5:
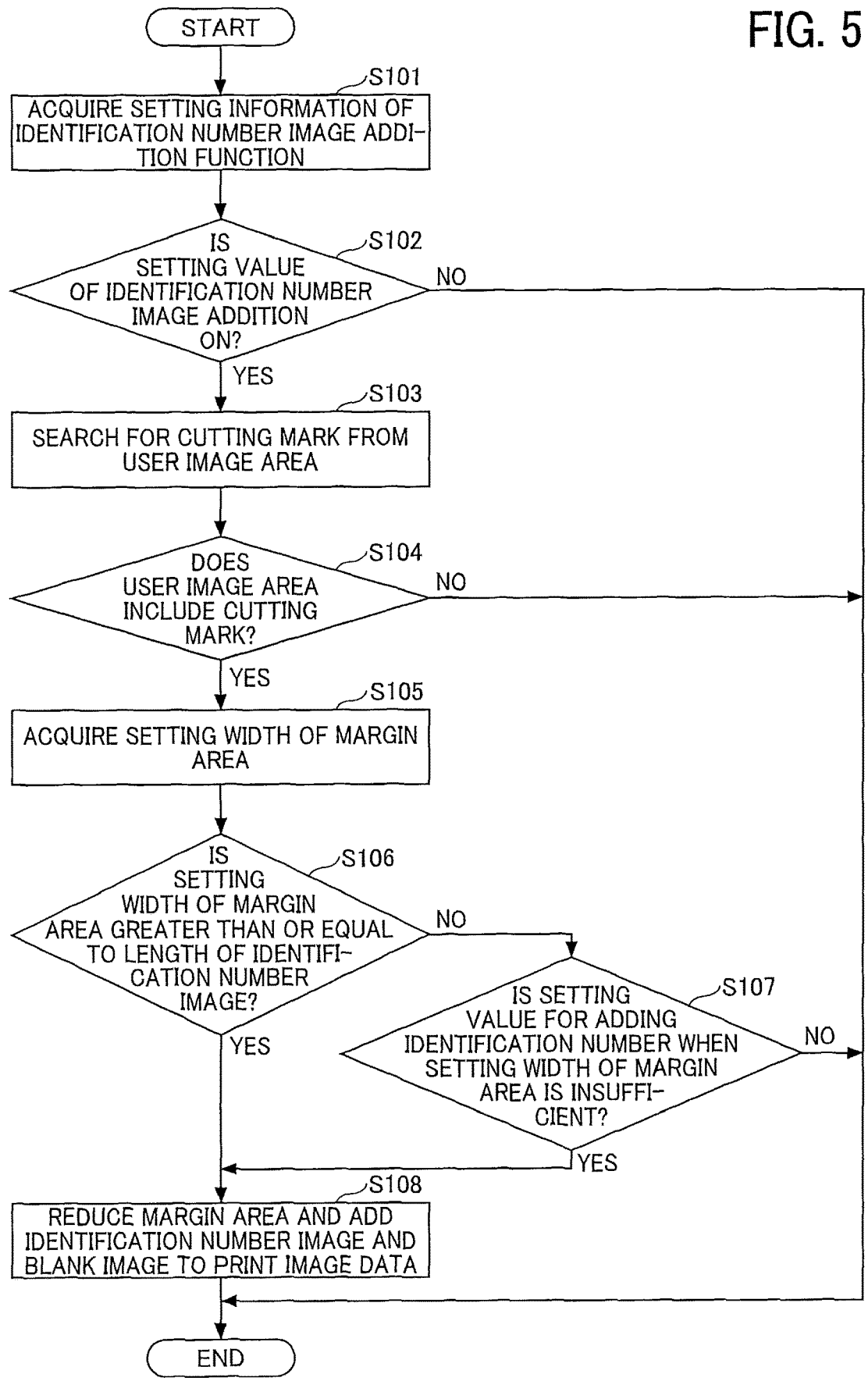
FIG. 5 is a flowchart of an example of an identification number image adding process.

FIG. 5 is a flowchart of an example of the identification number image adding process.

The rasterized image processing unit 212 acquires setting information of the identification number image adding function (step S101). The setting information of the identification number image adding function is stored in the storage unit 205 as information indicating the contents selected on the setting screen 301 illustrated in FIG. 4.

Next, the rasterized image processing unit 212 determines whether the setting value of the identification number image adding function is ON (step S102). When the rasterized image processing unit 212 determines that the setting value of the identification number image adding function is not ON (NO in step S102), the rasterized image processing unit 212 skips the processing from step S103 to step S108 and ends the identification number image adding process.

When the rasterized image processing unit 212 determines that the setting value of identification number image adding function is ON (YES in step S102), the rasterized image processing unit 212 searches for a cutting mark from the user image area (step S103).

The cutting mark is a mark that is generally used in printing for cutting, such as a trim mark or a corner mark. The rasterized image processing unit 212 analyzes the user image included in the print job data and determines whether a cutting mark is included in the user image area. A specific example of the analysis method is described below.

The rasterized image processing unit 212 determines whether a cutting mark is included in the user image area (step S104). When the rasterize image processing unit 212 determines that a cutting mark is not included in the user image area (NO in step S104), the rasterized image processing unit 212 ends the identification number image adding process.

On the other hand, when the rasterized image processing unit 212 determines that a cutting mark is included in the user image area (YES in step S104), the rasterized image processing unit 212 acquires the margin setting width (step S105). The margin setting width is a length of the margin area in a direction that affects whether the identification number image is fit within the margin area. The margin setting width is set in accordance with the features of the sheet to smoothly separate the sheet in the fixing device. A specific example of the margin setting width is described below.

Next, the rasterized image processing unit 212 determines whether the margin setting width is greater than or equal to the length of the identification number image (step S106). The vertical and horizontal lengths of the identification number image generated by the rasterized image processing unit 212 are defined in advance. Of the vertical and horizontal lengths, any one length along the same direction as the margin setting width in the identification number image is used for the determination.

When the rasterized image processing unit 212 determines that the margin setting width is not greater than or equal to the length of the identification number image (NO in step S106), the rasterized processing unit 212 determines whether the setting value of the identification number adding function with the insufficient margin setting width is ON (step S107). When the rasterized image processing unit 212 determines that the setting value of the identification number adding function with the insufficient margin setting width is not ON (NO in step S107), the rasterized processing unit 212 ends the identification number image adding process.

When the rasterized image processing unit 212 determines that the setting value of the identification number adding function with the insufficient margin setting width is ON (YES in step S107), in other words, the setting value is valid, the rasterized image processing unit 212 reduces the margin area and adds the identification number image and a blank image to the print image data (step S108). The blank image is an image in which the pixel values of the colors of CMYK are 0 (zero). Therefore, the printer 101 does not print a blank image. Further, the printer 101 processes the reduced blank area as an area not to be printed. A specific example of the step S108 is described below.

Note that the rasterized image processing unit 212 causes the storage unit 205 to store information indicating whether the step S108 process has been performed, in other words, the information indicates whether the identification number image is added to the print image data.

The mechanism control unit 206, the image processing control unit 208, and the imaging control unit 209 cooperate with each other to control printing on a sheet based on the print image data generated in the identification number image adding process executed by the rasterized image processing unit 212.

Figure 6:
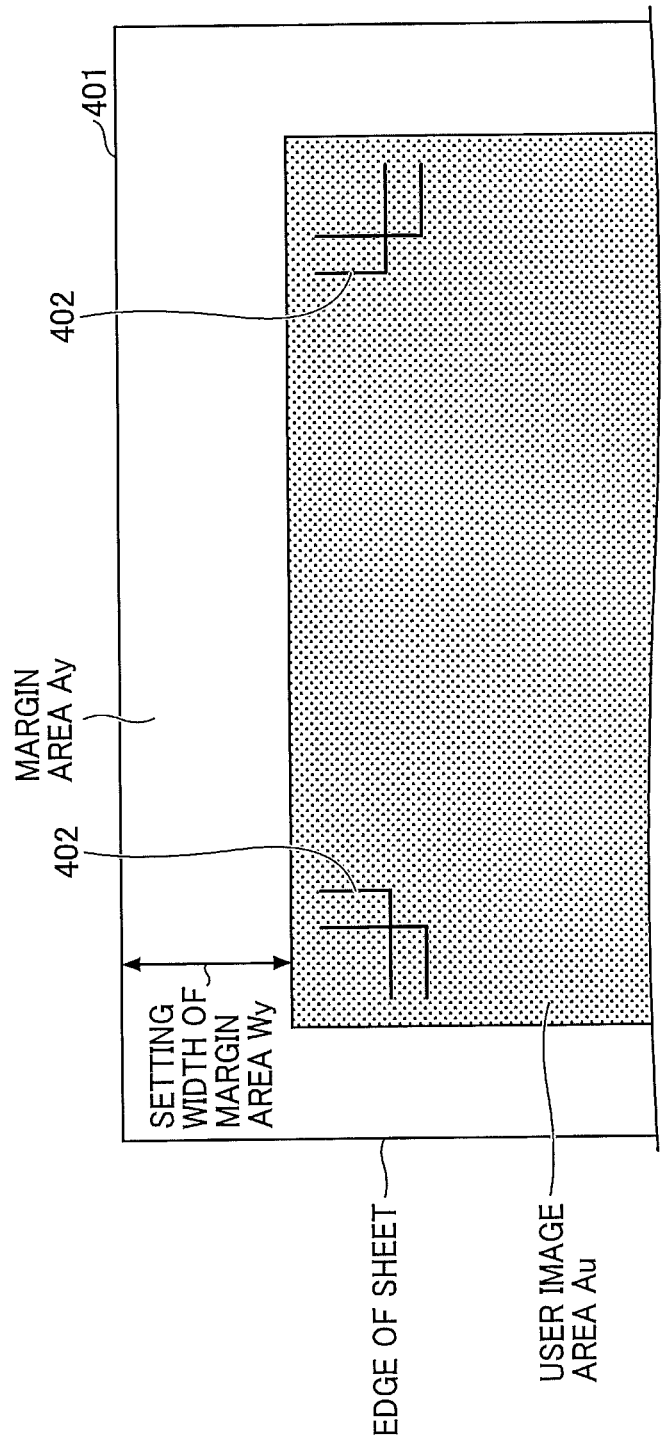
FIG. 6 is a diagram illustrating a margin area, according to embodiments of the present disclosure.

Next, descriptions are given of the margin area. FIG. 6 is a diagram illustrating the margin area, according to embodiments of the present disclosure.

A margin area Ay along the edge of a sheet 401 is set in advance for each type of sheet as an area where printing is not performed. An area of the sheet 401 excluding the margin area Ay is a user image area Au. The user image designated by the print job data is printed in the user image area Au of the sheet 401. When the sheet 401 is cut, the user image may include a cutting mark 402.

Further, the blank area Ay is an area within a certain length from the edge of the sheet 401 to the center of the sheet 401. In the following description, it is assumed that the identification number image is printed near the upper edge of the sheet 401. Note that the identification number image may be further printed near the bottom, right, and left edges of the sheet 401. In this case, the same processing described below may be applied to each edge. The margin area Ay at the upper edge of the sheet 401 is an area that fits within a certain length (setting width of a margin area Wy) from the upper edge of the sheet 401.

Figure 7:
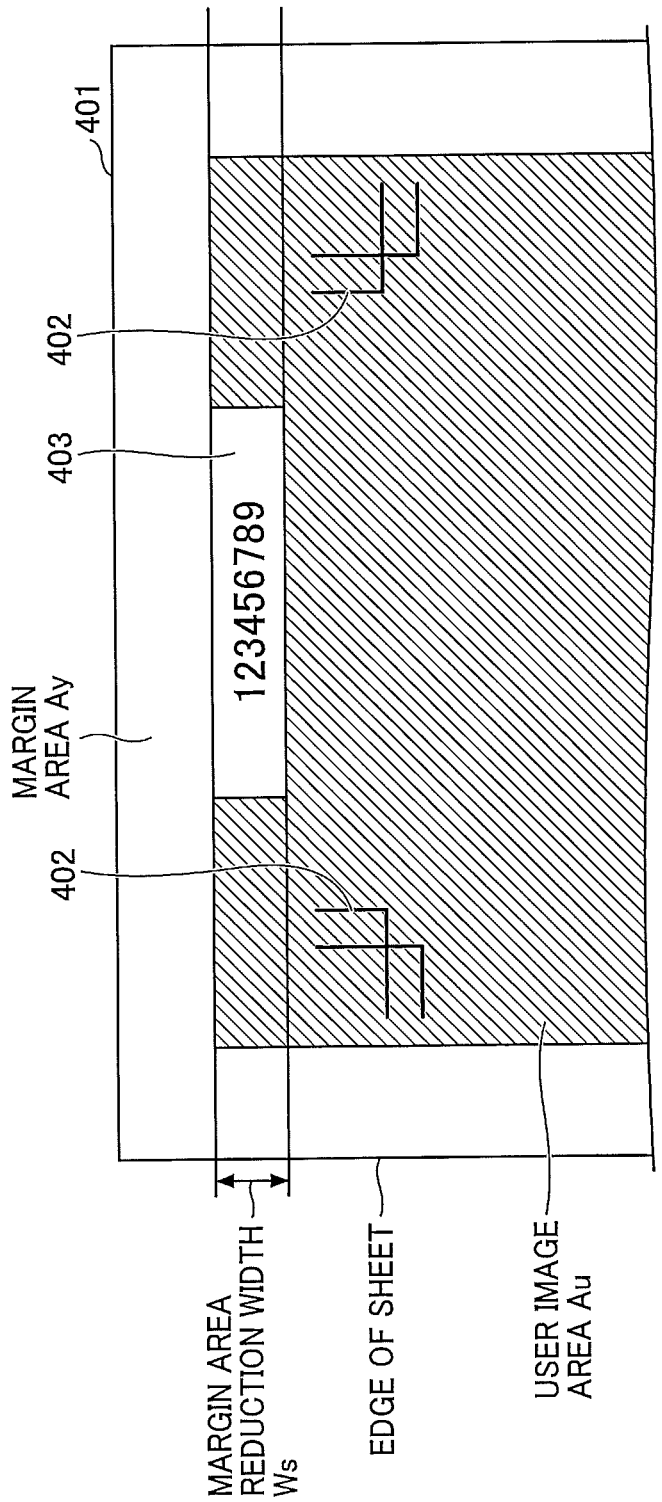
FIG. 7 is a diagram illustrating an identification number image, according to embodiments of the present disclosure.

FIG. 7 is a diagram illustrating the identification number image, according to embodiments of the present disclosure.

In step S108 of the identification number image adding process illustrated in FIG. 5, the rasterized image processing unit 212 reduces the margin area and adds the identification number image and the blank image to the print image. Specifically, as illustrated in FIG. 7, the rasterized image processing unit 212 reduces the margin area Ay toward the upper edge by a margin reduction width Ws in which the identification number image 403 is fit.

Figure 8:
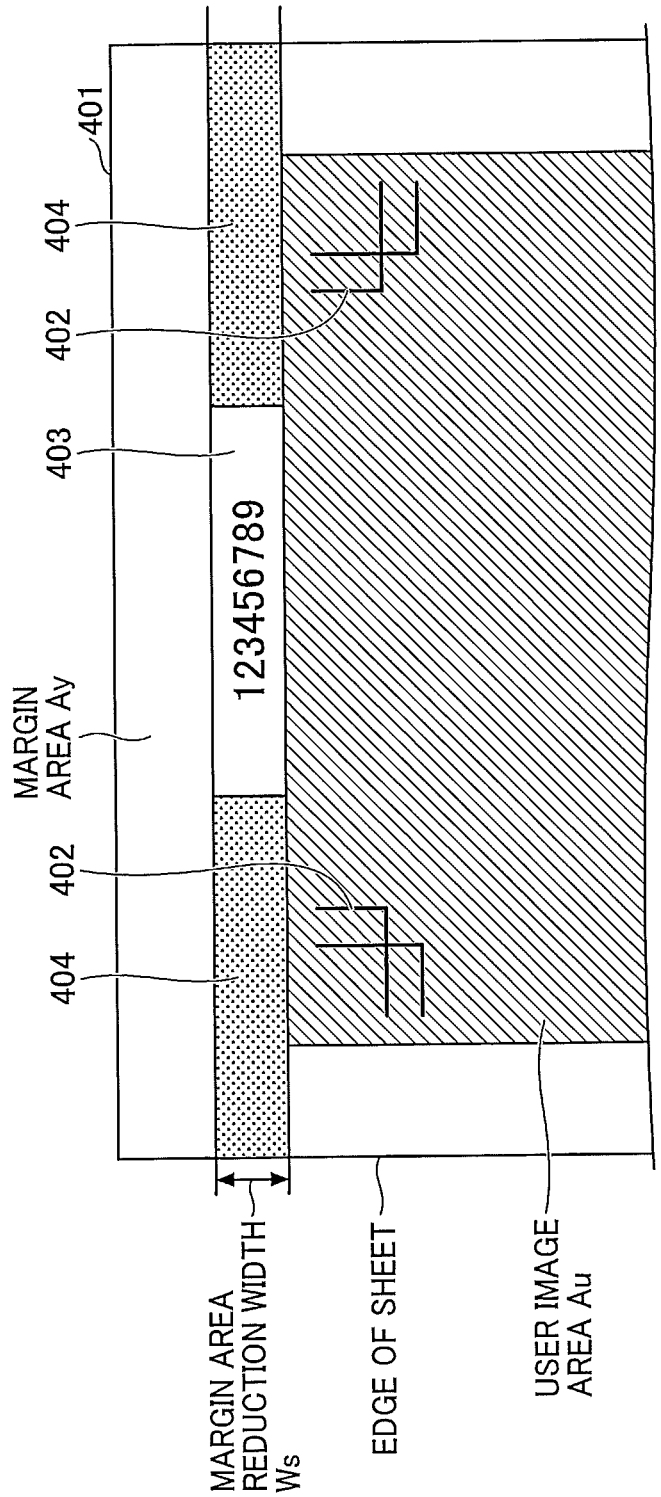
FIG. 8 is a diagram illustrating a blank image, according to embodiments of the present disclosure.

FIG. 8 is a diagram illustrating the blank image, according to embodiments of the present disclosure.

The blank image 404 added in step S108 of the flowchart of FIG. 5 is added to an area in which the identification number image 403 is not printed, among areas which are newly added to printing area by the reduction of the blank area Ay. Since the pixel values of each color of CMYK are 0 (zero) in the blank image 404, the toner image of each color is not transferred to the area.

Figure 9:
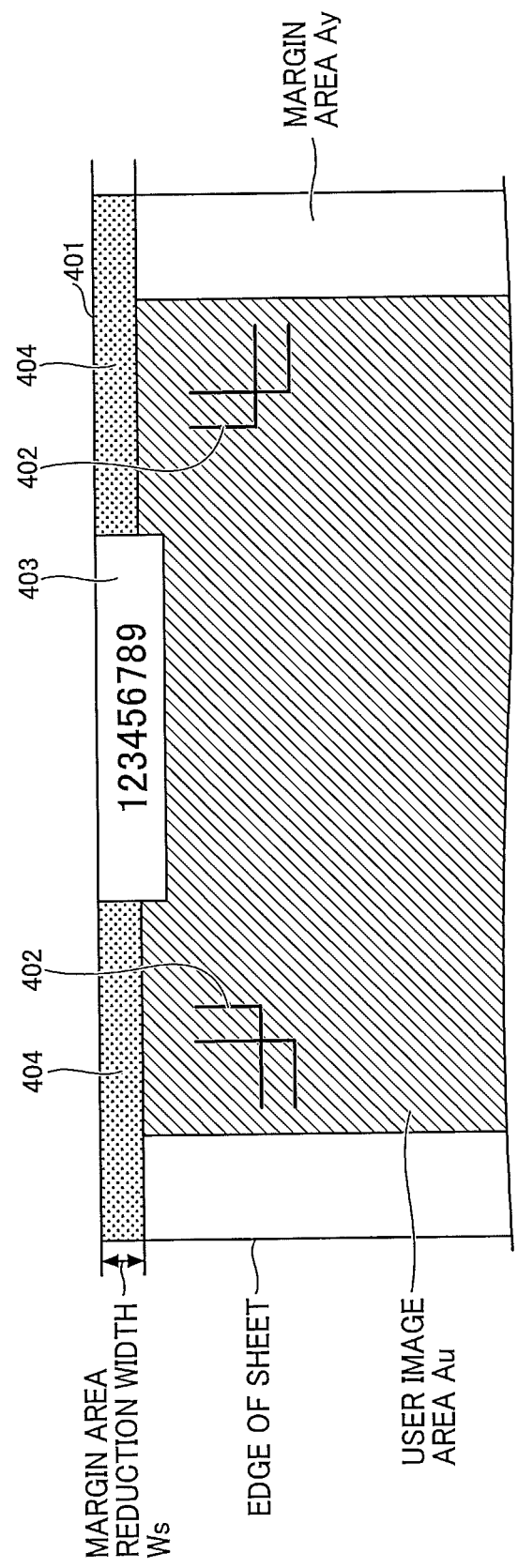
FIG. 9 is a diagram illustrating a case where a margin setting width is insufficient, according to embodiments of the present disclosure.

FIG. 9 is a diagram illustrating a case where the margin setting width is insufficient, according to embodiments of the present disclosure.

FIG. 9 illustrated a case where the rasterized image processing unit 212 determines that the margin setting width is not greater than or equal to the length of the identification number image, in step S106 of the identification number image adding process illustrated in FIG. 5 described above. When the setting value of the identification number adding function with the insufficient margin setting width is ON, the identification number image 403 is printed partially protruding into the user image area Au. Therefore, a user who constantly avoids the protrusion to the user image area Au may set the setting value of the identification number adding function to OFF in a case where the margin setting width is insufficient.

Figure 10:
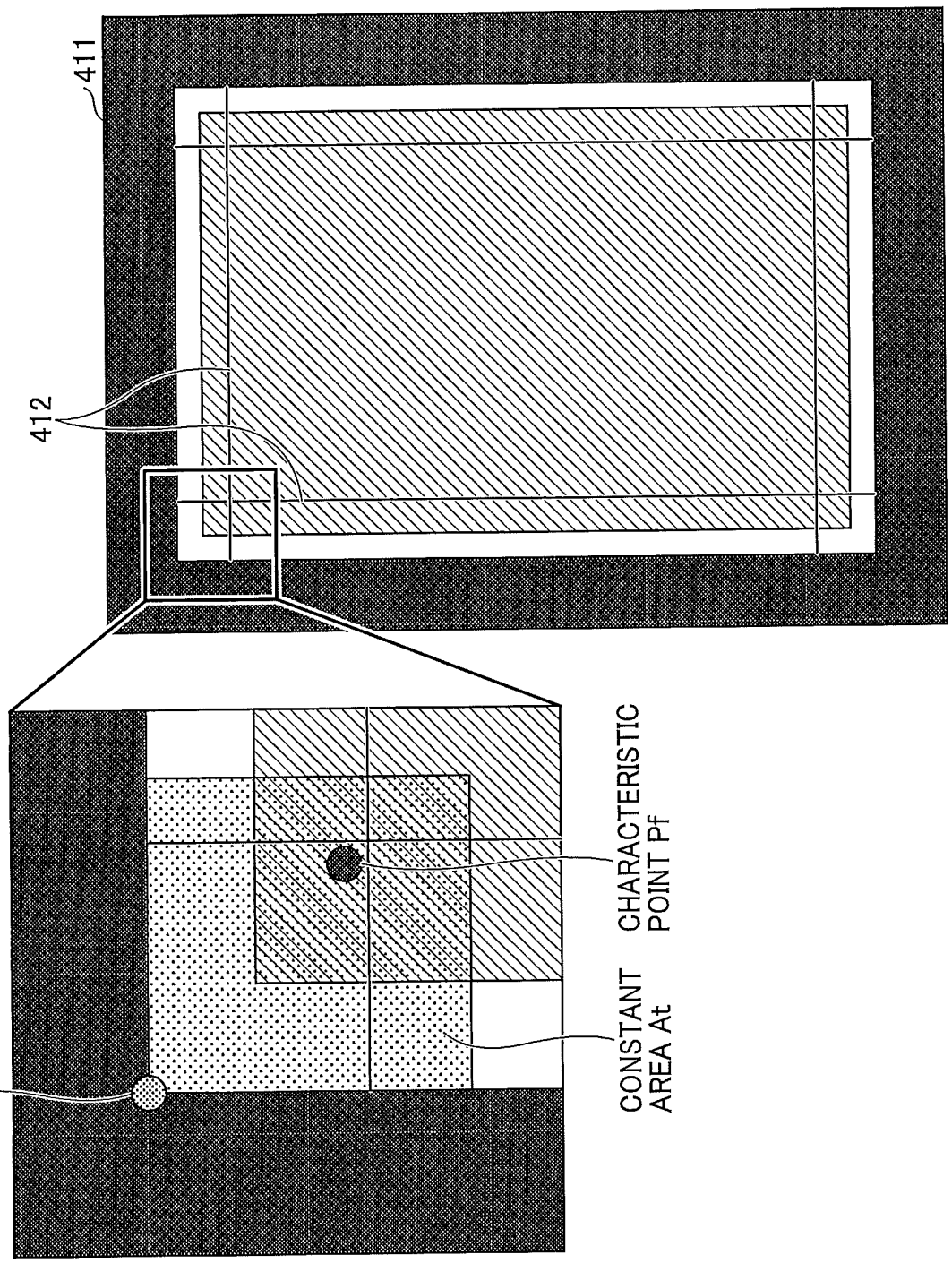
FIG. 10 is a diagram illustrating a method of searching for cutting marks, according to embodiments of the present disclosure.

FIG. 10 is a diagram illustrating a method of searching for cutting marks, according to embodiments of the present disclosure.

In step S103 of the identification number image adding process illustrated in FIG. 5 described above, the rasterized image processing unit 212 searches for the cutting mark from the user image area. The rasterized image processing unit 212 searches for the cutting mark from the read image data 411 read by the reading device 131. The cutting mark is, for example, a trim mark 412 illustrated in FIG. 10.

Specifically, for example, the rasterized image processing unit 212 performs corner detection and detects an interest point (interest point Pf) in an area (given area At) having a constant length from the upper left edge of the sheet. A corner is an area where a large change in pixel value is observed in each direction. The rasterized image processing unit 212 employs, for example, a Harris operator as a corner detection method (algorithm). Further, since the cutting mark is generally printed on the edge portion of the sheet, the interest points closest to the upper left, lower left, upper right, and lower right edge portions of the sheet are selected from the interest points detected by the corner detection. Then, the rasterized image processing unit 212 determines that the cutting mark is present in the step S104 of FIG. 5 when the interest point Pfs are detected at the upper left, lower left, upper right, and lower right of the sheet.

Next, descriptions are given of process for determining whether to display an identification number in a case where the printer 101 displays information about a defect detected by the inspection device 104.

Figure 11:
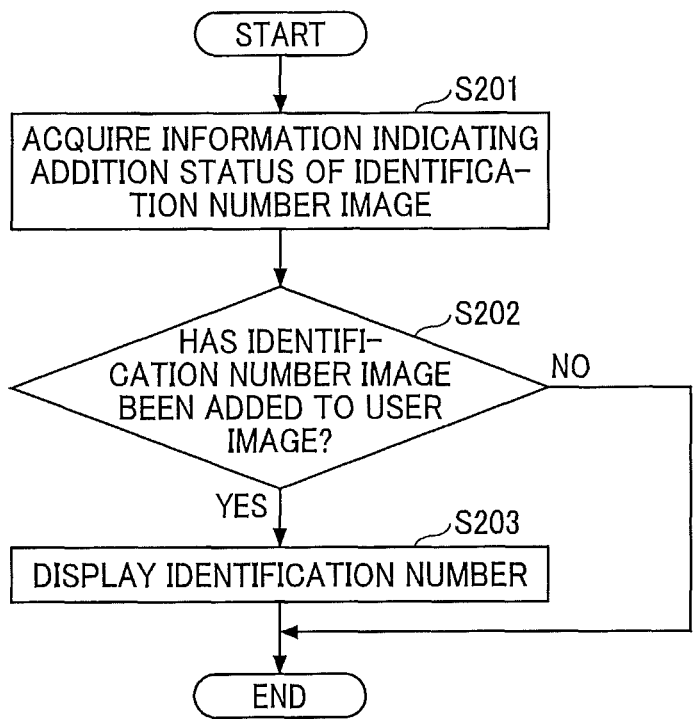
FIG. 11 is a flowchart of an example of an identification number display determination process.

FIG. 11 is a flowchart of an example of an identification number display determination process.

The job information processing unit 211 acquires information indicating whether the identification number image is added to the print image data, in other words, information indicating the addition status of the identification number image (step S201). The information indicating the addition status of the identification number image is the information stored in the storage unit 205 at step S108 of the identification number image adding process illustrated in FIG. 5 described above.

The job information processing unit 211 determines whether the identification number image is added to the user image based on the information indicating the addition status of the identification number image (step S202). When the job information processing unit 211 determines that the identification number image is added (YES in step S202), the job information processing unit 211 displays the identification number (step S203).

Note that the printer 101 may transmit information indicating the addition status of the identification number image to the inspection device 104. In this case, the inspection device 104 may execute the identification number display determination process illustrated in FIG. 11 when the inspection device 104 displays the information about the detected defect.

Figure 12:
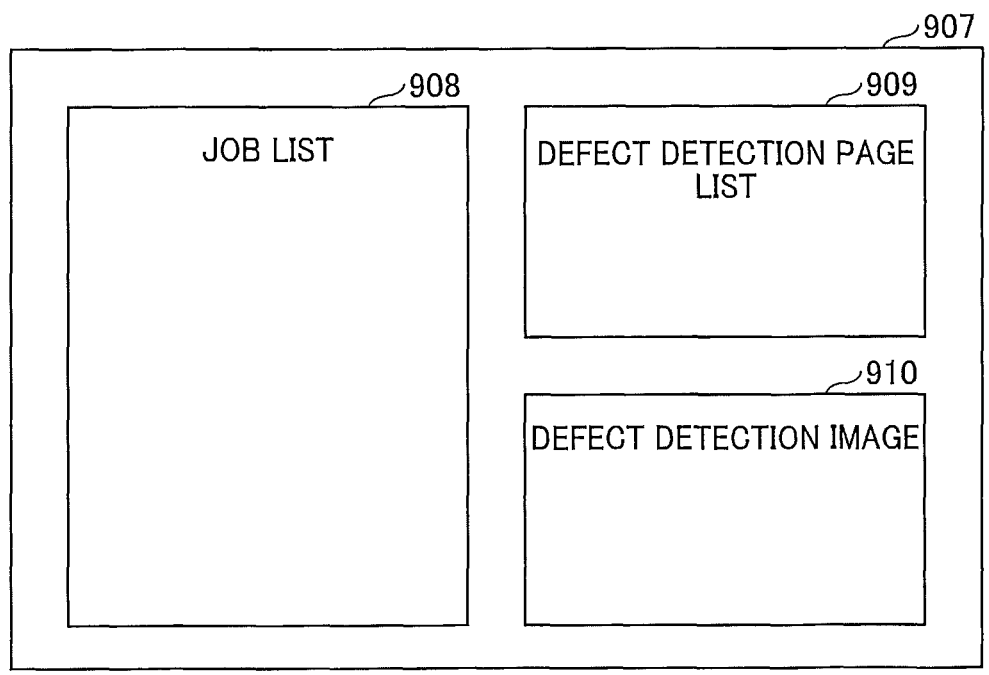
FIG. 12 is a diagram illustrating an example of a defect display screen.

FIG. 12 is a diagram illustrating an example of a defect display screen. The display screens described in FIG. 12 and subsequent drawings are screens displayed on the operation panel 102 by the display control unit 202 of the printer 101. Alternatively, the screen may be displayed by the inspection device 104 transmitting screen information in response to a request received from the operation panel 102 or a display unit such as a web browser of another apparatus. The inspection device 104 may transmit the screen information by bidirectional communication or push transmission.

A defect display screen 907 displays detected defects. The defect display screen 907 includes a "JOB LIST" display area 908, a "DEFECT DETECTION PAGE LIST" display area 909, and a "DEFECT DETECTION IMAGE" display area 910.

FIG. 13 is a diagram illustrating an example of a job list.

The job list displayed in the "JOB LIST" display area 908 includes items "INSPECTION PROCESSING START TIME", "NUMBER OF COPIES OF JOB", "NUMBER OF PAGES OF JOB", and "NUMBER OF DEFECT-DETECTED PAGES OF JOB". The job list may include identification information to identify the job, such as job names or job IDs, with which a plurality of jobs is confirmed and identified.

The value of the item "INSPECTION PROCESSING START TIME" is a value indicating the start time of the inspection processing of the first page of the print job.

The value of the item "NUMBER OF COPIES OF JOB" is a value indicating the number of copies output in the print job.

The value of the item "NUMBER OF PAGES OF JOB" is a value indicating the number of pages included in the print job.

The value of the item "NUMBER OF DEFECT-DETECTED PAGES OF JOB" is a value indicating the number of pages with defects detected in the print job.

FIG. 14 is a diagram illustrating an example of the defect detection page list.

The defect detection page list displayed in the "DEFECT DETECTION PAGE LIST" display area 909 includes items "DEFECT DETECTION TIME", "IDENTIFICATION NUMBER", "JOB ID", "NUMBER OF DEFECTIVE COPIES OCCURRED IN JOB", and "NUMBER OF DEFECTIVE PAGES OCCURRED IN JOB".

The value of the item "DEFECT DETECTION TIME" is a value indicating the time at which the defect was detected for each page.

The value of the item "IDENTIFICATION NUMBER" is an identification number to identify the page where the defect has occurred. In the item "IDENTIFICATION NUMBER", a value is displayed in a case where the processing of step S203 of the identification number display determination process illustrated in FIG. 11 is executed. On the other hand, in a case where the processing of step S203 of the identification number display determination process illustrated in FIG. 11 is not executed, any specific value is not displayed but a character "-" (hyphen) is displayed. The "-" indicates that the identification number is not assigned.

The value of the item "JOB ID" is an identifier to identify a job.

The value of the item "NUMBER OF DEFECTIVE COPIES OCCURRED IN JOB" is a value indicating the number of copies where the defect has occurred.

The value of the item "NUMBER OF DEFECTIVE PAGES OCCURRED IN JOB" is a value indicating the number of pages where the defect has occurred.

Figure 15:
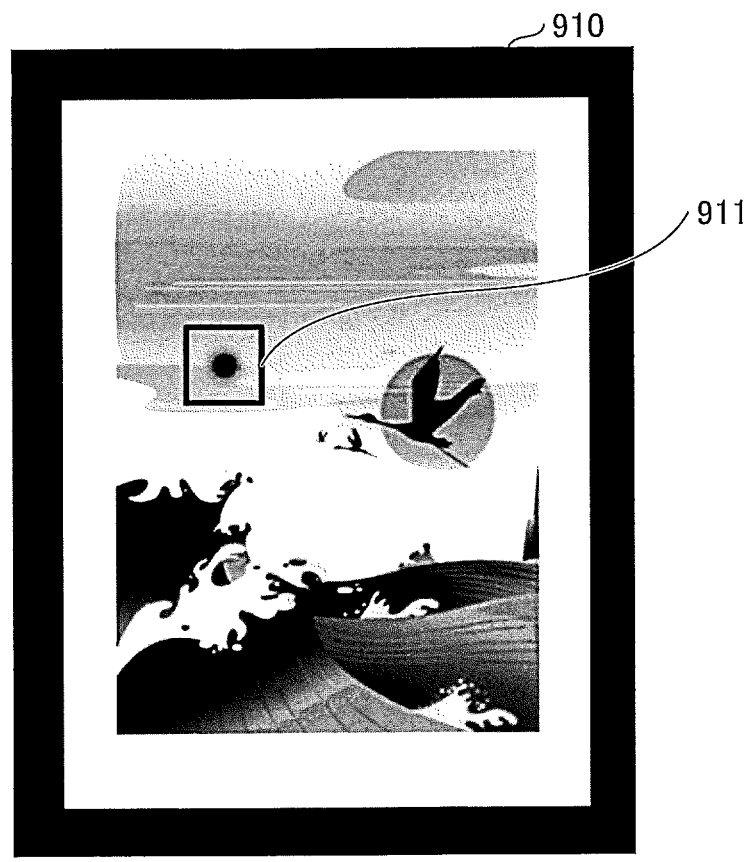
FIG. 15 is a diagram illustrating an example of a defect detection image.

FIG. 15 is a diagram illustrating an example of the defect detection image.

The "DEFECT DETECTION IMAGE" display area 910 in FIG. 19 displays read image data of a printed page designated in the defect detection page list illustrated in FIG. 14 to which a display 911 indicating the defect detection portion is added.

Figure 16:
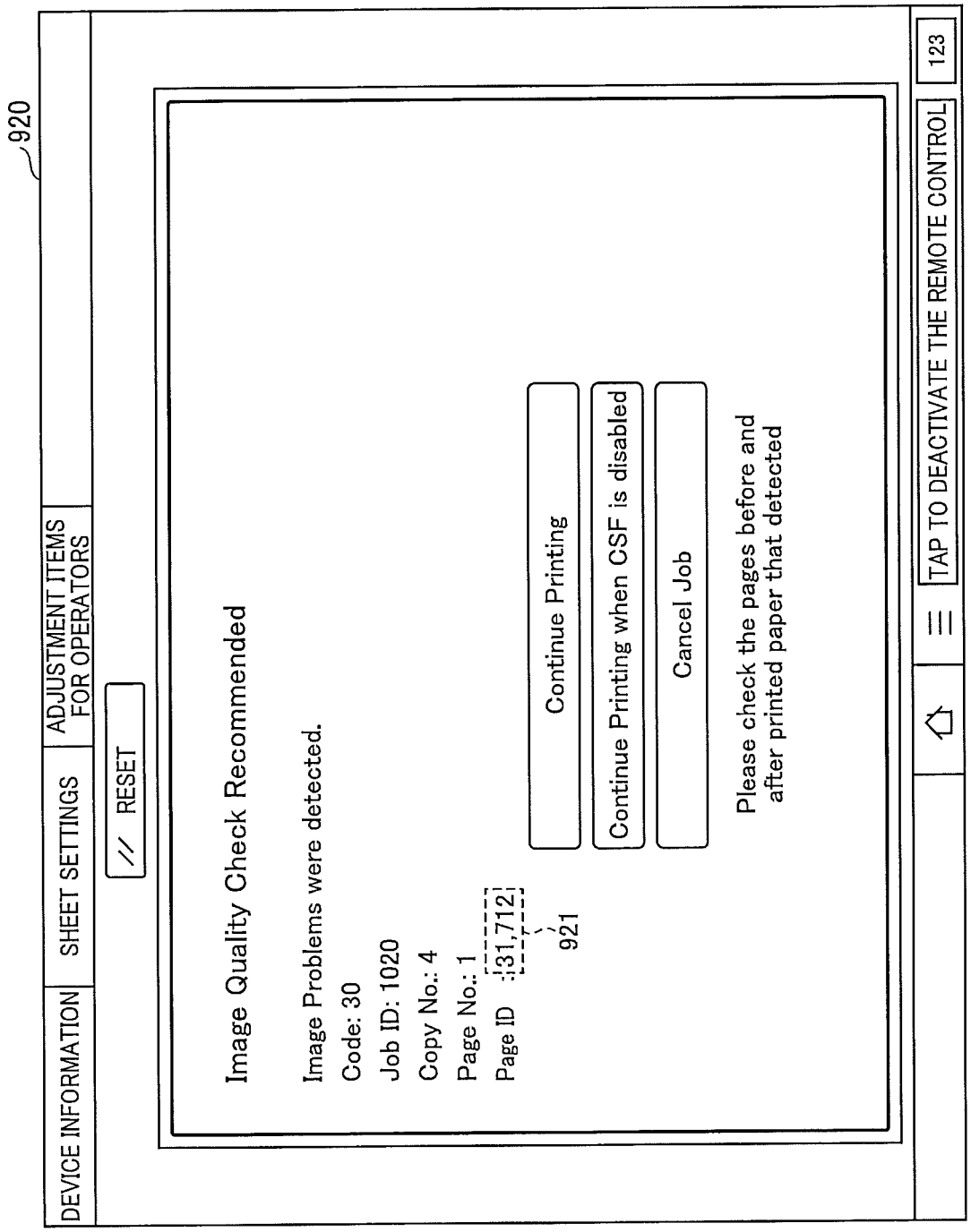
FIG. 16 is a diagram illustrating an example of an error screen.

FIG. 16 is a diagram illustrating an example of an error screen.

The inspection device 104 may instruct the printer 101 to stop printing at detection of a defect. In this case, the display control unit 202 stops the print job temporarily in response to receipt of the instruction to stop the print job from the inspection device 104, then displays the error screen illustrated in FIG. 16 on the operation panel 102. The error screen 920 includes buttons such as the "Continue Printing" button and the "Cancel Job" button, a job ID in which a defect is detected, the number of copies, the number of pages, and a display 921 of an identification number for identifying a page. In the display 921, a value is displayed in a case where the processing of step S203 of the identification number display determination process illustrated in FIG. 11 is executed, and "-" is displayed in a case where the processing of step S203 of the identification number display determination process illustrated in FIG. 11 is not executed. The "-" indicates that the identification number is not assigned.

The image forming system 10 according to the present embodiment generates print image data for printing a user image (first image) included in print job data on a sheet (conveyance medium). The image forming system 10 generates the print image data by providing an area where an identification number image (second image) including identification information to identify each page of the sheet (conveyance medium) is printed in a margin area (first area) which is an area where the user image (first image) is not printed. Since the margin area (first area) is usually less likely to be used as an area to be printed, the identification information may be printed at a position less likely to be used on the conveyance medium. Further, the image forming system 10 reduces the margin area (first area) toward the edge of the sheet (conveyance medium) to provide an area on which the identification number image (second image) is printed.

In addition, when the identification information is printed at a position close to an edge of the conveyance medium in order to be included in an area to be cut after printing, the identification information overlaps with a margin area set in advance and a part of the identification information is not printed. On the other hand, the image forming system 10 according to the present embodiment generates print image data including a third area and a fourth area. The third area is a non-printing area obtained by reducing a margin area (first area). The fourth area is outside the third area and includes an identification number image (second image) and is arranged in the margin area (first area) before reduction. Due to such a configuration, the identification number image (second image) is reliably printed.

Further, in a case where a blank image is not overwritten in an area excluding the identification number image (second image) and where there is a user image that has been cut out by setting of a margin area, a part of the user image of the cut-out portion is printed. Then, for example, a background color other than white may be printed in the area, and a non toner transferred area on which no toner is transferred may not be sufficiently obtained. As a result, separation of the sheet in the fixing device may be prevented. On the other hand, the image forming system 10 according to the present embodiment generates print image data including a blank image indicating that printing is not to be executed in an area excluding the identification number image (second image) in the fourth area. Due to such a configuration, an area where printing is not performed is obtained and an impact of reduction of the margin area (first area) is reduced.

Further, the image forming system 10 searches for a cutting mark from the user image (first image). When the user image includes cutting mark, the image forming system 10 generates print image data including an identification number image (second image). As a result, in a case where a print job not including sheet cutting is performed, printing of an identification number image that the user is unaware of is avoided. On the other hand, in a case where a print job including sheet cutting is performed, an identification number image that the user is not aware of may be printed in an area that is to be cut.

Further, the image forming system 10 generates print image data by: arranging the identification number image (second image) outside the user image (first image) and the third area that is reduced by narrowing the margin area (first area) toward the edge of the sheet (conveyance medium);

and arranging a blank image indicating that printing is not performed next to the identification number image (second image).

Note that the printer 101 may receive setting of the display position of the identification number image. For example, the printer 101 may receive an input of XY coordinates (a coordinate system having an X-axis in the left-right direction and a Y-axis in the up-down direction) indicating an upper left position of the identification number image. Alternatively, the printer 101 may receive a selection of one or more combinations of an upper edge, a lower edge, a left edge, and a right edge of the conveyance medium. Then, for example, in the case of the upper edge or the lower edge, the printer 101 may receive setting of a distance between the center of the conveyance medium in the X direction and the center of the identification number image in the X direction and a distance between the user image area and the identification number image.

In each of the above-described embodiments, the DFE 105, the inspection device 104 and the printer 101 are configured to share the above-described processing steps in various combinations. Further, the elements of the DFE 105, the inspection device 104 and the printer 101 may be integrated into one apparatus or may be separately disposed in a plurality of different apparatuses.

In an embodiment, the DFE 105 or the inspection device 104 may be configured as an information processing system including a plurality of computing devices such as a server cluster. The plurality of computing devices is configured to communicate with one another via any type of communication link, including a network or shared memory to implement the processing described in the present invention.

In the above-described embodiments, the stacker 14 includes one sheet ejection tray 141. However, in other embodiments, the stacker 14 may include the plurality of sheet ejection trays 141.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming system comprising:
processing circuitry configured to:
generate print image data for printing a first image included in print job data, on a conveyance medium;
control printing on the conveyance medium based on the print image data;
reduce the first area toward an edge of the conveyance medium to set the area for printing the second image; and
generate the print image data including a third area and a fourth area outside the third area, wherein
the generation of the print image data includes setting an area for printing a second image including identification information to identify each page of the conveyance medium, in a first area where the first image is not printed,
the third area is a non-printing area obtained by reduction of the first area toward the edge of the conveyance medium, and
the fourth area includes the second image and is in the first area before the reduction.

2. The image forming system according to claim 1, wherein the processing circuitry is configured to generate the print image data including a blank image in an area excluding the second image in the fourth area, and
wherein the blank image indicates that printing is not performed.

3. The image forming system according to claim 1, wherein the processing circuitry is configured to locate the second image including the identification information, outside the first image and the third area that is reduced by narrowing the first area toward the edge of the conveyance medium, and locate a blank image indicating that printing is not performed, next to the second image, to generate the print image data.

4. The image forming system according to claim 1, wherein the processing circuitry is configured to:
search for a cutting mark from the first image; and
generate the print image data including the second image in a case where the first image includes the cutting mark.

5. The image forming system according to claim 1, wherein the processing circuitry is configured to reduce the first area to generate the print image data, in a case where setting for adding and printing the second image including the identification information is valid.

6. The image forming system according to claim 1, wherein the first area is an area set in advance for each type of sheet as an area where printing is not performed.

7. An image forming method to be performed by a computer, the image forming method comprising:
generating print image data for printing a first image included in print job data, on a conveyance medium;
controlling printing on the conveyance medium based on the print image data;
reducing the first area toward an edge of the conveyance medium to set the area for printing the second image; and
generating the print image data including a third area and a fourth area outside the third area, wherein
the generation of the print image data includes setting an area for printing a second image including identification information to identify each page of the conveyance medium, in a first area where the first image is not printed,
the third area being a non-printing area obtained by reduction of the first area toward the edge of the conveyance medium, and
the fourth area including the second image and is in the first area before the reduction.

8. A non-transitory, computer-readable storage medium storing computer-readable program code that causes a computer to perform:
generating print image data to print a first image included in print job data, on a conveyance medium;
printing on the conveyance medium based on the print image data;

reducing the first area toward an edge of the conveyance medium to set the area for printing the second image; and generating the print image data including a third area and a fourth area outside the third area, wherein
  the generation of the print image data includes setting an area for printing a second image including identification information to identify each page of the conveyance medium, in a first area where the first image is not printed,
  the third area being a non-printing area obtained by reduction of the first area toward the edge of the conveyance medium, and
  the fourth area including the second image and is in the first area before the reduction.

* * * * *